US007549588B2

(12) United States Patent
Montagutelli

(10) Patent No.: US 7,549,588 B2
(45) Date of Patent: Jun. 23, 2009

(54) DEVICE FOR ISSUING A TICKET FOR THERMAL OR ANALOGUE PRINTING MECHANISM, AUTHORIZING THE RESTITUTION OF THE TICKET AGAINST A REVERSE WITHDRAWAL CONTROL

(75) Inventor: Denis Montagutelli, Angers (FR)

(73) Assignee: APS Engineering, Paris (FR)

( * ) Notice: Subject to any disclaimer, the term of this patent is extended or adjusted under 35 U.S.C. 154(b) by 315 days.

(21) Appl. No.: 10/585,786

(22) PCT Filed: Jan. 12, 2005

(86) PCT No.: PCT/FR2005/050017

§ 371 (c)(1),
(2), (4) Date: Sep. 28, 2006

(87) PCT Pub. No.: WO2006/095060

PCT Pub. Date: Sep. 14, 2006

(65) Prior Publication Data

US 2007/0194114 A1 Aug. 23, 2007

(30) Foreign Application Priority Data

Jan. 13, 2004 (FR) .................................. 04 00250

(51) Int. Cl.
*G06K 13/04* (2006.01)

(52) U.S. Cl. ........................ 235/479; 235/380; 235/475

(58) Field of Classification Search ................. 235/381, 235/384, 475, 479; 283/53
See application file for complete search history.

(56) References Cited

U.S. PATENT DOCUMENTS 5,250,793 A * 10/1993 Nagashima et al. ......... 235/475
5,684,285 A * 11/1997 Faes et al. ................... 235/449

FOREIGN PATENT DOCUMENTS

GB 505 224 A 5/1939
JP 05342439 A * 12/1993
JP 2002-024869 A 1/2002
JP 2003-256880 A 9/2003

OTHER PUBLICATIONS

International Search Report mailed Jun. 1, 2005 of International Application PCT/FR2005/050017.

* cited by examiner

*Primary Examiner*—Seung H Lee
(74) *Attorney, Agent, or Firm*—Westerman, Hattori, Daniels & Adrian, LLP.

(57) ABSTRACT

The device of the invention is a device for issuing a ticket (1) from a tape reserve for a printing mechanism. Such device implements at least one pair of rolls (2, 3) motorized (4) for driving the ticket (1) towards an evacuation opening (5) of the mechanism. The implementation of motorized means (4) for driving the rolls (2, 3) is slaved to first control means (7) for issuing A' the ticket (1) and second control means (8) for retracting B' the ticket (1). Means (10) for inhibiting second control means (8) are slaved to means (11) for detecting the moment when the user is taking the ticket (1) in the retracting path B', for authorizing reverse rotational impulse of the driving rolls (2, 3) in order to return the ticket (1) notwithstanding a prior control (8) for retracting the ticket (1).

20 Claims, 1 Drawing Sheet

DEVICE FOR ISSUING A TICKET FOR THERMAL OR ANALOGUE PRINTING MECHANISM, AUTHORIZING THE RESTITUTION OF THE TICKET AGAINST A REVERSE WITHDRAWAL CONTROL

TECHNICAL FIELD OF THE INVENTION

The invention belongs to the field of printing mechanisms of a ticket to be issued, a thermal printing mechanism in particular. It relates to a device provided for such a printing mechanism, for issuing the ticket outside an evacuation opening.

STATE OF THE ART

It should be reminded that printing mechanisms are known, including means for conveying a ticket to be issued from a reserve towards an evacuation opening. More particularly in the case when the ticket is issued from a tape shaped into a roll, such as for thermal printing mechanisms, the tape is conveyed from the reserve towards a print head, then towards a cutting member for separating the printed ticket from the remainder, of the tape. The ticket is then driven towards the evacuation opening outside which it protrudes for being grasped and withdrawn by the user. It should be noted that at this stage of the description of the present invention that the means for driving the ticket currently implement one pair of motorised rolls, between which the ticket runs.

It has appeared that when in use, the ticket is liable to remain protruding from the evacuation opening, waiting for being possibly withdrawn by the user. Such a situation prevents a following ticket from being issued, by reason of the evacuation opening being plugged.

A first solution suggested commonly consists in leaving a following user the possibility of withdrawing the ticket of a previous user, possibly to expel the ticket outside the evacuation opening. Such a solution is not ideal, because notably of the confidential information which may be held on the ticket and/or the unwanted presence of wastage in the close environment of the printing mechanism.

Consequently, a second solution has been suggested which consists in slaving the implementation of motorisation means of the rolls for driving the ticket, to means for detecting the presence of the ticket protruding from the evacuation opening. More precisely, this other solution suggested commonly consists in retracting the ticket that has not been withdrawn by a user towards the inside of the printing mechanism, for evacuation towards a bin. Such retraction is performed after implementing the rolls for driving the ticket into a rotational direction opposite to that corresponding to the conveyance of the ticket towards the evacuation opening. Such reverse motorisation of the driving rolls is for example caused by delay means, for retracting the ticket that has not been withdrawn beyond a reference timeout. However, the chronometric slaving of the retraction of the ticket exhibits the shortcoming of not taking into account the actual wish of the user. Indeed, it appears in use that the latter, perceiving a retraction of the ticket, grips it as it is driven towards the inside of the printing mechanism. Such a gesture from the user causes the ticket to slip between the rolls against the rotation thereof, which is not satisfactory. Besides, the force for driving the ticket by the rolls may be rather significant, with consequently a risk of injury for the user, whereas the ticket might be torn off as well.

It appears that the solutions suggested conventionally relative to the unwanted persistence of the ticket protruding from the evacuation opening, are not satisfactory.

Besides, it is common in the field of issuing tickets to slave the motorisation of the driving rolls to means for detecting the presence of the ticket, protruding from the evacuation opening, so that placing the ticket into such position stops the motorisation of the driving rolls until withdrawn by the user. It should be noted that in this position of the ticket, either it has been separated previously from the remainder of the tape for being driven independently towards the evacuation opening, and notably enabling it, if necessary, to be retracted as mentioned above, or the separation of the ticket from the remainder of the tape is made from a traction exerted thereto by the user in order to apply it against a cutting blade.

In case when the ticket has been separated previously from the remainder of the tape, and to enable its withdrawal from a traction exerted by the user, a first known solution consists in organizing the issuance device so as to authorize easy passive rotation of the driving rolls.

In the case of a preferable usage of a stepper motor known to be more reliable as regards the control of accuracy of its operation and therefore the accuracy of the conveyance of the ticket, another known solution consists in detecting a rotation of the driving rolls caused by a traction applied on the ticket by the user, for controlling the motorisation of the driving rolls so as to accompany the issuance of the ticket outside the evacuation opening.

It appears finally that the solutions suggested in the field for issuing a ticket, should meet at best a compromise taking into account different constraints which are notably linked with the operating modalities of the printing mechanisms, the customs of the users and the cost for obtaining such mechanisms which should not be restrictive.

OBJECT OF THE INVENTION

The present invention lies in this general context for issuing a ticket by a thermal or analogue printing mechanism, and aims more particularly at offering a device for issuing such a ticket meeting satisfactorily the constraints in the field, while offering notably a suitable solution to the problem raised by the unwanted situation when the ticket us protruding persistently from the evacuation opening, until it is eventually withdrawn by the user.

The inventive approach of the present invention has consisted globally, as soon as the decision has been made to cause the retraction of the ticket protruding persistently from the evacuation opening, in authorising nevertheless voluntary withdrawal by the user of the ticket against the retraction of the latter. Such authorization is notably controlled from the detection when the user is taking the ticket whereon he is liable to exert a traction against the contrary loads exerted by the driving rolls for retracting the ticket, such a detection breaking the antagonism of the loads exerted on the ticket respectively by the driving rolls and by the user, for authorizing reverse rotational impulse of the driving rolls in the conveyance direction of the ticket towards the evacuation opening, with a view to returning said ticket.

Such arrangements are such that the operating modalities of the device for issuing a ticket according to the present invention consist in particular in:

a) conveying the ticket towards the evacuation opening, for emerging outside the latter until withdrawn by the user, such conveying path being provided by a rotational impulse of the driving rolls into a first rotational direction, b) detecting the protruding position of the ticket as being possibly persistent beyond the reference information, corresponding for example to a duration or to an order for issuing a following ticket, c) retracting if necessary the ticket from a rotational impulse of the rolls in a second rotational direction opposite to that, the first, conveying path of the ticket towards the evacuation opening, d) detecting the moment when the user is taking the ticket in the retracting path, e) inhibiting the motorisation of the driving rolls causing the retraction of the ticket, for authorizing the rotation of the driving rolls in the direction opposite to the former, i.e. in the first rotational direction, and provide a conveying path of the ticket towards the evacuation opening in view of the restitution thereof.

It will be observed that the reverse rotational impulse of the driving rolls for the restitution of the ticket is indifferently, either a passive rotational impulse caused by the traction freely exerted on the ticket by the user, or and preferably, a positive rotational impulse caused by implementing the motorisation of the driving rolls in the rotational direction corresponding to the conveyance of the ticket towards the evacuation opening.

It will be noted however that preferably the step consisting in inhibiting the motorisation of the rolls in the second rotational direction should be associated with a motorisation of the rolls in the reverse direction in the first rotational direction. The purpose of such motorisation is to cause positive feeding of the ticket towards the evacuation opening, in view of the return thereof.

Moreover, the means for detecting the moment when the user may be taking the ticket in order to withdraw it notwithstanding the retraction thereof are, for example, indifferently means for detecting a flatness difference of the ticket between a reference flatness during the retraction thereof and an effective flatness measured of the ticket, or still and preferably, means of detection of a difference in the rotational speed of the driving rolls between a reference speed and an effective speed measured, possibly still means for detecting the presence of the user's hand in the vicinity of the evacuation opening.

It should be remarked however that the step consisting in detecting when the ticket is taken by the user, lies preferably more particularly in detecting a difference in the angular velocities of the rolls between a reference angular velocity and an angular velocity measured extemporaneously.

It will be understood that, as known, the different means of detection associate means for storing reference information and means of comparison between said reference information and corresponding piece of effective information which is measured extemporaneously by measuring means.

It will be noted that generally, without departing from the framework of the invention mentioned above, the embodiment variations specified above, quoted by way of example, are not exhaustive, as regards the structure of the means for authorising reverse rotation of the driving rolls in order to return the ticket, as well as regards the structure of the means of detection when the user is taking the ticket in the retracting path.

DESCRIPTION OF THE FIGURES

The present invention will be understood better and relevant details will appear in the following description in conjunction with the figures of the appended drawing, wherein.

Figure 1:
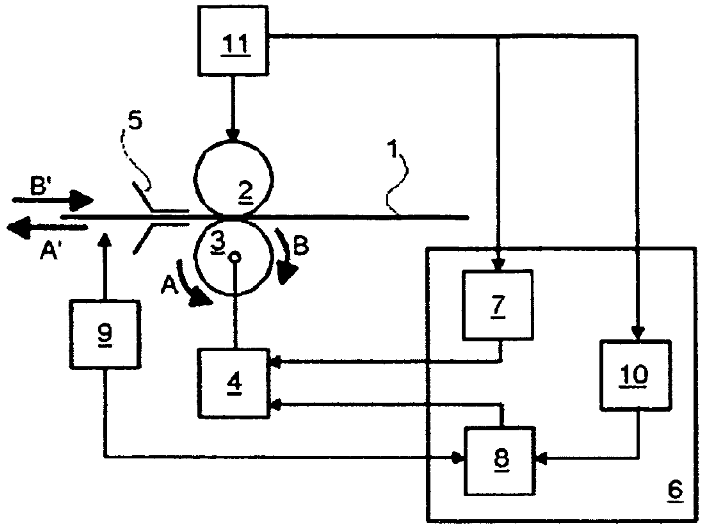
FIG. 1 is a diagram illustrating the organization of a device for issuing a ticket according to a preferred embodiment of the present invention.

On FIG. 1, a ticket 1 is issued from a tape reserve of a printing mechanism, the usual members of such mechanism, as the thermal print head and the cutting member separating the ticket from the remainder of the tape not being represented.

This printing mechanism is fitted with a device for issuing the ticket 1, which implements at least one pair of rolls 2 and 3 motorised by the motorised means 4, for driving the ticket 1. It will be observed on the example of embodiment illustrated that as conventionally in the domain, only one of the two rolls is motorised while the other roll 2 rests elastically against the motorised roll 3. The ticket 1 runs between the driving rolls 2 and 3 to be conveyed by friction towards an evacuation opening 5 of the mechanism. It will be noted at this stage of the description that such conveying of the ticket is conducted indifferently prior and/or simultaneously with its separation from the remainder of the tape by a cutting member.

The implementation of the motorised means 4 for driving the rolls 2 and 3 is slaved to control means 6. Such control means 6 comprise first control means 7 for issuing the ticket 1, causing the rotation of the driving rolls 2 and 3 into a first rotational direction A which corresponds to a conveying path A' of the ticket 1 towards the evacuation opening 5, so as to place it in a withdrawal position for the user.

The control means 6 also comprise second means 8 for controlling the retraction B' of the ticket 1, causing the rotation of the driving rolls 2 and 3 into a second rotational direction B opposite to the former.

It will be noted that the retracting direction B' of the ticket 1 is a driving direction of the latter opposite to that A' which aims at placing the ticket into a withdrawal position for the user. The purpose of such retraction is particularly to convey the ticket 1 towards a storage bin, not represented, included in the mechanism in a manner known in the art. The second means 8 for controlling the retraction B' of the ticket 1 are slaved to means of detection 9 of the persisting withdrawal position of the ticket 1 beyond the reference information.

According to a feature of the device of the present invention, said device includes moreover means 10 for inhibiting second control means 8, whereof the implementation is slaved to means 11 for detecting when the user is taking the ticket 1 while it is retracting B'. Such combination of means constitutes means possibly for negating the loads applied to the ticket 1 respectively by the user and by the rolls 2 and 3 driven by the motorised means 4 in the second rotational direction B, such a rupture authorising reverse rotational impulse A of the driving rolls 2 and 3 for authorising restitution of the ticket 1 notwithstanding prior implementation of second control means 8 for retracting the ticket 1.

It will be noted that the selection of the designers bears preferably upon an advantageous usage of a stepping motor for driving the rolls 2 and 3. However, the use of such a motor only enables with difficulty to drive the rolls 2 and 3 from a simple traction exerted by the user on the ticket 1. Thus, and according to a preferred embodiment of the invention nevertheless not restrictive to such a usage of a stepping motor, the means of detection 11 when the user is taking the ticket 1 in the retracting path are means intended for detecting a difference in the rotational speed of the driving rolls 2 and 3, between a reference speed and an effective speed measured. Such means of detection 11 are associated with first control means 7 in order to, possibly, cause the implementation of the motorised means 4 of the driving rolls 2 and 3 in the corresponding rotational direction A.

It will be noted that according to the diverse embodiment variations, the means of detection 11 of a difference in the rotational speed of the driving rolls 2 and 3 are any of the means of detection of a torque difference applied to the rolls 2 and 3 between a reference torque and a measured torque and/or means of detection of a difference in the angular velocities of the rolls 2 and 3 between a reference angular velocity and an angular velocity measured.

Figure 2:
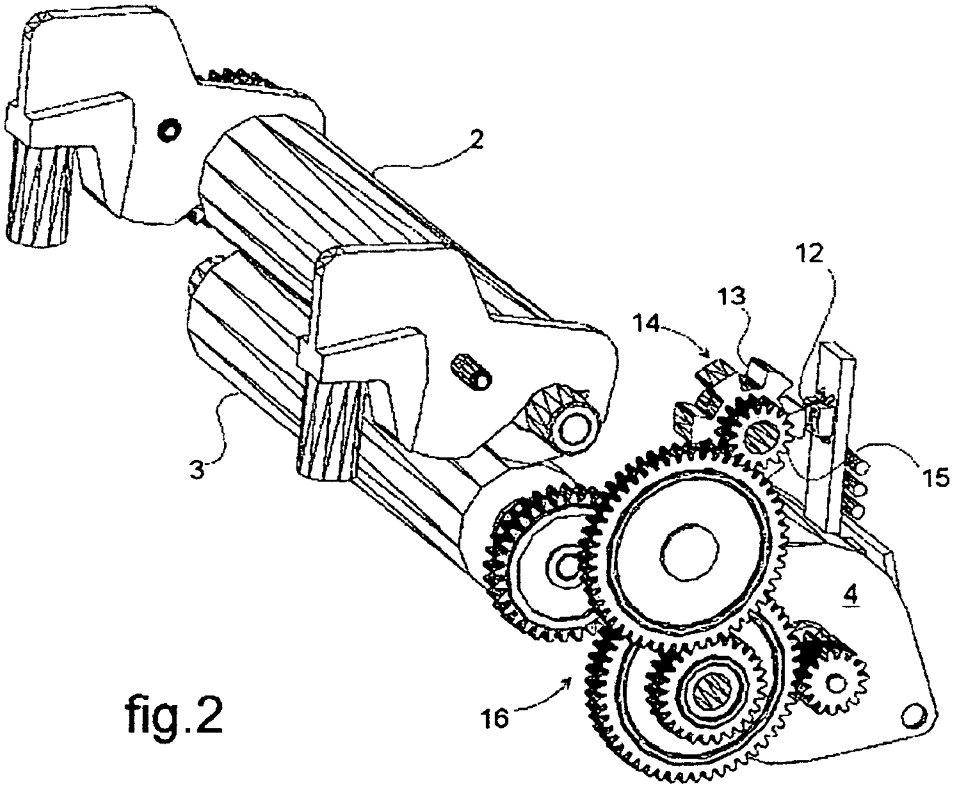
FIG. 2 is a partial perspective illustration of a printing mechanism fitted with a device for issuing a ticket according to a preferred embodiment of the present invention.

However, and with reference moreover to FIG. 2, it is preferable to organise the means of detection 11 of a difference in the rotational speed of the driving rolls 2 and 3 as means of detection of a difference in the angular velocities of the rolls 2 and 3. For example, such means 11 are of optical type including notably an optic sensor 12 for reading a plurality of marks, such as 13, provided on a disc 14 driven into rotation jointly with any of the rolls 2 and 3, and preferably the roll 3 driven directly by the motorised means 4.

On the embodiment example represented on FIG. 2, the disc 14 is meshed by dint of a pinion 15 on a wheel gear 16 interposed between the motorised means 4 and the roll 2 or 3 to which the disc is allocated 14. Besides, the disc 14 includes on its edge a plurality of undercuts distributed regularly along the periphery thereof, constituting said marks 13.

The invention claimed is:

1. A device for issuing a ticket from a tape reserve for a printing mechanism, such device comprising:

at least one pair of motorized rolls for driving the ticket between which the ticket runs in order to convey the ticket towards an evacuation opening of the mechanism, motorized means for driving the rolls, the implementation thereof being slaved to control means, said control means including first control means for issuing the ticket causing the rotation of the driving rolls into a first rotational direction corresponding to a conveying path of the ticket towards the evacuation opening in order to place the ticket into a withdrawal position for the user, and second control means for retracting the ticket causing the rotation of the driving rolls into a second rotational direction opposite to the first rotational direction, said second control means being slaved to means of detection of the persisting withdrawal position of the ticket beyond a reference information, and means for inhibiting second control means, implementation of said inhibition means being slaved to means for detecting the moment when the user is taking the ticket in the retracting path for interrupting the opposition between the loads applied on the ticket respectively by the user and by the rolls driven by the motorized means in the second rotational direction, this interruption enabling reverse rotation of the driving rolls for authorizing restitution of the ticket notwithstanding prior implementation of the second control means for retracting the ticket.

2. A device for issuing a ticket according to claim 1, wherein the means for detecting the moment when the user is taking the ticket in the retracting path are formed by at least one of (i) means for detecting a flatness difference of the ticket between a reference flatness during the retraction thereof and an effective flatness measured of the ticket, (ii) means for detecting a difference in the rotational speed of the driving rolls between a reference speed and an effective speed measured, and (iii) means for detecting the presence of the user's hand in close vicinity of the evacuation opening.

3. A device for issuing a ticket according to claim 2, wherein the means for detecting the moment when the user is taking the ticket in the retracting path are means for detecting a difference in the rotational speed of the driving rolls between a reference speed and an effective speed measured, said detection means being associated with the first control means in order to cause the implementation as appropriate of the motorized means of the driving rolls in the corresponding rotational direction.

4. A device for issuing a ticket according to claim 3, wherein the means for detecting a difference in the rotational speed of the driving rolls are any of (i) means for detecting a torque difference applied to the rolls between a reference torque and a measured torque and (ii) means for detecting a difference in the angular velocities of the rolls between a reference angular velocity and an angular velocity measured.

5. A device for issuing a ticket according to claim 4, wherein the means for detecting a difference in the angular velocities of the rolls are optical means including an optic sensor for reading a plurality of marks provided on a disc driven into rotation jointly with any of the rolls.

6. A device for issuing a ticket according to claim 5, wherein the disc is meshed by dint of a pinion on a wheel gear interposed between the motorized means and the roll to which the disc is allocated, said disc including on the edge thereof a plurality of undercuts distributed regularly along the periphery thereof, constituting said marks.

7. A device for issuing a ticket according to claim 2, wherein the reverse rotational impulse of the driving rolls for the restitution of the ticket comprises at least one of (i) a passive rotational impulse caused by a traction exerted freely on the ticket by the user, and (ii) a positive rotational impulse caused from the implementation of the first control means for driving the rolls in the rotational direction corresponding to the conveying path of the ticket towards the evacuation opening.

8. A device for issuing a ticket according to claim 7, wherein the means for detecting the moment when the user is taking the ticket in the retracting path are means for detecting a difference in the rotational speed of the driving rolls between a reference speed and an effective speed measured, said detection means being associated with the first control means in order to cause the implementation as appropriate of the motorized means of the driving rolls in the corresponding rotational direction.

9. A device for issuing a ticket according to claim 8, wherein the means for detecting a difference in the rotational speed of the driving rolls are any of (i) means for detecting a torque difference applied to the rolls between a reference torque and a measured torque and (ii) means for detecting a difference in the angular velocities of the rolls between a reference angular velocity and an angular velocity measured.

10. A device for issuing a ticket according to claim 9, wherein the means for detecting a difference in the angular velocities of the rolls are optical means including an optic sensor for reading a plurality of marks provided on a disc driven into rotation jointly with any of the rolls.

11. A device for issuing a ticket according to claim 10, wherein the disc is meshed by dint of a pinion on a wheel gear interposed between the motorized means and the roll to which the disc is allocated, said disc including on the edge thereof a plurality of undercuts distributed regularly along the periphery thereof, constituting said marks.

12. A device for issuing a ticket according to claim 1, wherein the reverse rotational impulse of the driving rolls for the restitution of the ticket comprises at least one of (i) a passive rotational impulse caused by a traction exerted freely on the ticket by the user, and (ii) a positive rotational impulse caused from the implementation of the first control means for driving the rolls in the rotational direction corresponding to the conveying path of the ticket towards the evacuation opening.

13. A device for issuing a ticket according to claim 12, wherein the means for detecting the moment when the user is taking the ticket in the retracting path are means for detecting a difference in the rotational speed of the driving rolls between a reference speed and an effective speed measured, said detection means being associated with the first control means in order to cause the implementation as appropriate of the motorized means of the driving rolls in the corresponding rotational direction.

14. A device for issuing a ticket according to claim 13, wherein the means for detecting a difference in the rotational speed of the driving rolls are any of (i) means for detecting a torque difference applied to the rolls between a reference torque and a measured torque and (ii) means for detecting a difference in the angular velocities of the rolls between a reference angular velocity and an angular velocity measured.

15. A device for issuing a ticket according to claim 14, wherein the means for detecting a difference in the angular velocities of the rolls are optical means including an optic sensor for reading a plurality of marks provided on a disc driven into rotation jointly with any of the rolls.

16. A device for issuing a ticket according to claim 15, wherein the disc is meshed by dint of a pinion on a wheel gear interposed between the motorized means and the roll to which the disc is allocated, said disc including on the edge thereof a plurality of undercuts distributed regularly along the periphery thereof, constituting said marks.

17. A method for issuing a ticket by a printing mechanism implementing a device according to claim 1, which comprises:

a) conveying the ticket towards the evacuation opening, for emerging outside the evacuation opening until withdrawn by the user, said conveying being provided by a rotational impulse of the driving rolls into a first rotational direction, b) detecting the protruding position of the ticket as being possibly persistent beyond a reference information, c) retracting the ticket as appropriate from a rotational impulse of the rolls in a second rotational direction opposite to the first rotational direction, d) detecting the moment when the user is taking the ticket in the retracting path, e) inhibiting the motorization of the driving rolls causing the retraction of the ticket, for authorising the rotation of the driving rolls in the reverse direction to the previous enabling conveying of the ticket towards the evacuation opening in view of the restitution thereof.

18. A method for issuing a ticket according to claim 17, wherein the step of detecting the moment when the ticket is taken by the user comprises detecting a difference in the angular velocities of the rolls between a reference angular velocity and an angular velocity measured extemporaneously.

19. A method for issuing a ticket according to claim 18, wherein the step of inhibiting the motorization of the rolls in the second rotational direction is associated with a motorization of the rolls in the reverse direction for positive conveying of the ticket towards the evacuation opening in view of the restitution thereof.

20. A method for issuing a ticket according to claim 17, wherein the step of inhibiting the motorization of the rolls in the second rotational direction is associated with a motorization of the rolls in the reverse direction for positive conveying of the ticket towards the evacuation opening in view of the restitution thereof.

* * * * *